G. B. & W. A. HAYES.
BEET HARVESTING MACHINE.
APPLICATION FILED OCT. 16, 1912.
1,168,804.
Patented Jan. 18, 1916.
3 SHEETS—SHEET 1.
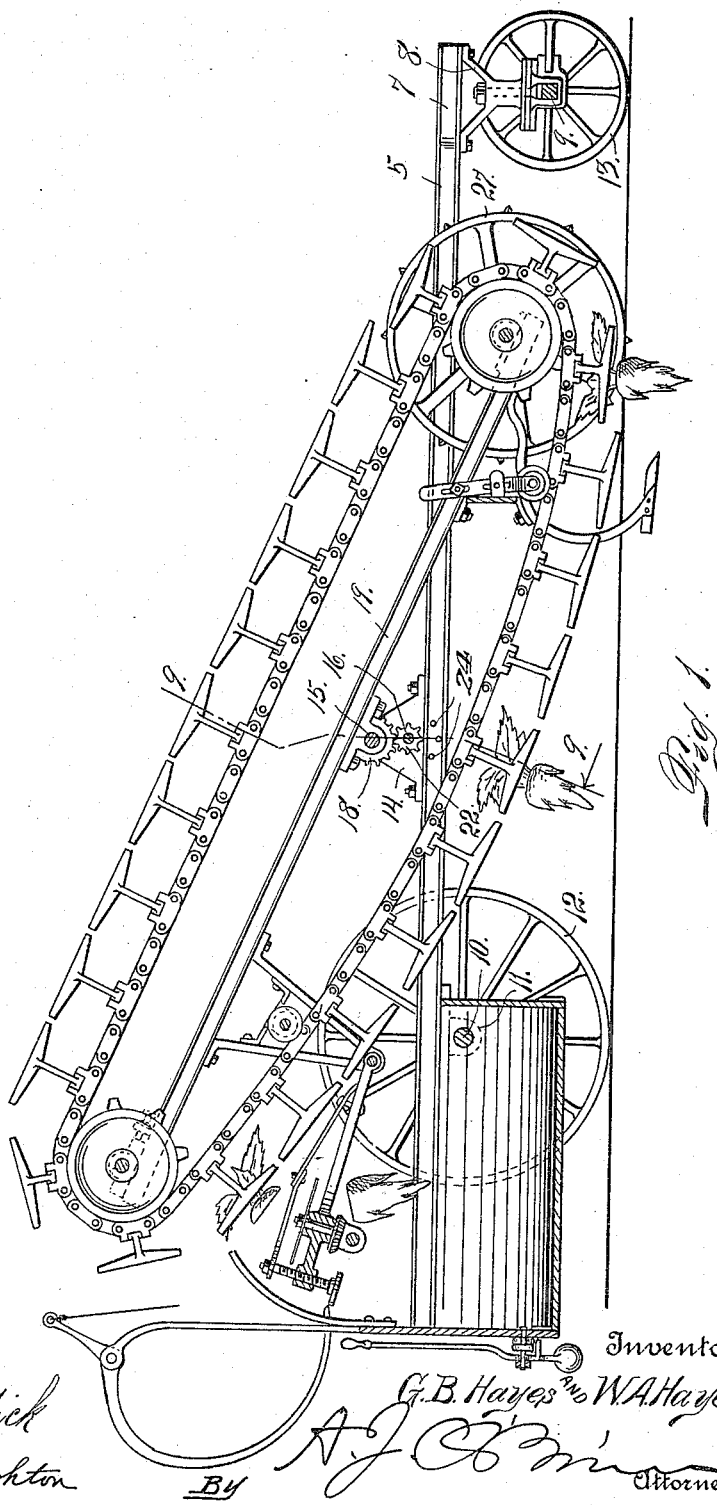
Witnesses
Otto E. Hoddick
Solon J. Boughton
Inventors
G. B. Hayes and W. A. Hayes,
BY A. J. O'Brien
Attorney

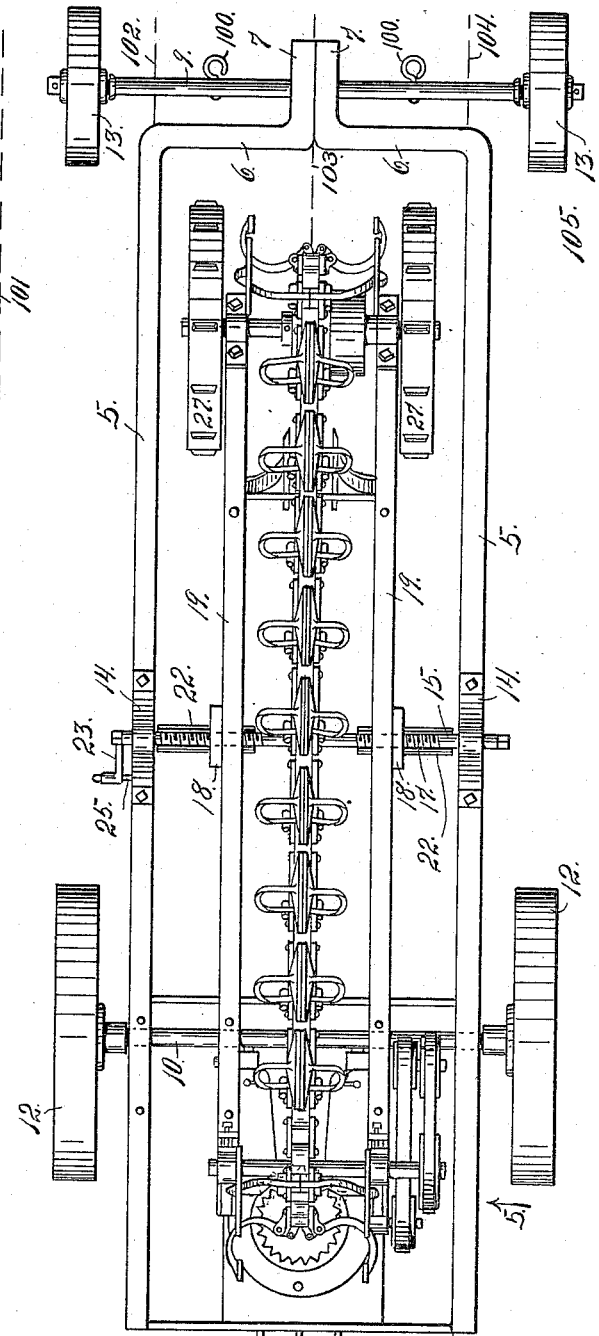

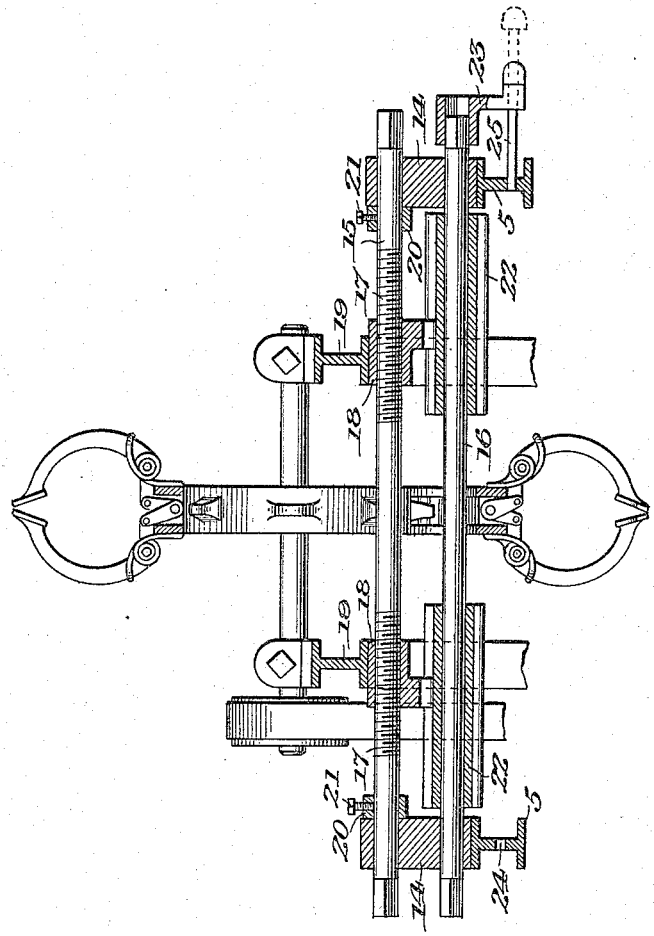

UNITED STATES PATENT OFFICE.

GEORGE B. HAYES AND WALTER A. HAYES, OF DENVER, COLORADO.

BEET-HARVESTING MACHINE.

1,168,804. Specification of Letters Patent. Patented Jan. 18, 1916.

Application filed October 16, 1912. Serial No. 725,979.

*To all whom it may concern:*

Be it known that we, GEORGE B. HAYES and WALTER A. HAYES, citizens of the United States, residing in the city and county of Denver and State of Colorado, have invented certain new and useful Improvements in Beet-Harvesting Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to a harvesting machine, and is particularly valuable for harvesting beets and similar vegetables.

One object of the invention is to provide means whereby the entire operating mechanism may be shifted bodily crosswise of the supporting frame in order that the digging and pulling apparatus may be brought into alinement with a row of beets, while the wheels and horses drawing the vehicle move in the middle lines between the rows whether the rows be spaced 16, 18 or 20 inches.

Another object of the invention is to so mount the operating mechanism at its forward end that it will ride evenly over the ground, independently of the frame of the vehicle upon which it is carried.

One embodiment of our invention is illustrated in the accompanying drawings, in which:

Figure 1 is a vertical, longitudinal section of the machine. Fig. 2 is a plan view of the machine. Fig. 3 is a sectional view taken on the line 9—9, Fig. 1, and looking in the direction of the arrow.

Similar reference numerals apply to similar parts throughout the views.

Referring now to the drawings more particularly, let the numeral 5 indicate horizontal members forming a main frame of the machine, these members 5 having inwardly bent portions 6 meeting at the middle of the front end of the machine and bent thence forwardly to form the portions 7 to which is bolted a downwardly extending bracket 8 to which is swiveled the front axle 9. A rear axle 10 is mounted in suitable journal boxes 11 secured to the side members 5 of the frame. The axles have mounted thereon ground wheels 12 and 13.

Upon the side members 5 and approximately midway of the frame are mounted blocks 14. Within these blocks are rotatably supported, one above the other, two shafts, the upper one being numbered 15 and the lower 16. The shaft 15 is screw-threaded in two portions 17, and upon these screw-threaded portions are mounted gear sectors 18 internally threaded to fit the threads 17 of the shaft. These sectors 18 are bolted to longitudinally extending bars 19 forming the outer members of an auxiliary frame, upon which are mounted the operating devices. Collars 20 surround the shaft 15 and are secured thereto by set screws 21 to prevent longitudinal movement of this shaft. The shaft 16 has fixed thereto comparatively long pinions 22 meshing with the gear sectors 18. The shafts 15 and 16 are each squared at both ends in order to receive a crank handle 23, by means of which the shafts are adapted to be rotated, and the frame members 5 are provided with holes 24 to receive a pin 25 which slides through an opening in the crank 23, and in one position may be utilized as a handle for the crank.

The operation of our harvester will now be described.

It should be understood that the machine as illustrated in Figs. 1 and 2 will be drawn toward the right, the horses or other tractive power being attached to the front axle 9 by hooks 100. Let the broken lines 101, 102, 103, 104 and 105 indicate the rows of beets. These rows are spaced 16, 18, or 20 inches apart, according to the richness of the soil in which the beets are planted. In driving the machine through the beet field, it is so guided as to cause the wheels 12 and 13 to pass between the rows to avoid running over the undug rows of beets on one side and to run upon firm ground on the side upon which the beets have been dug. Now, after the machine has been so positioned we adjust the digging and plowing apparatus laterally so as to cause it to aline with the row of beets to be dug. This is accomplished by placing the crank handle 23 upon either squared end of the shaft 15 and rotating the same, whereby the longitudinally threaded gear sectors 18 are caused to move upon the threaded portions 17 of the shaft until the apparatus has reached the desired lateral position. In order that the teeth of the gear sectors 18 may mesh continuously with the teeth of the gears 22, regardless of the lateral adjustment of the sectors, the gears 22 are elongated as shown in Fig. 9.

The forward portion of the digging and plowing apparatus mounted upon the pivoted auxiliary frame is slightly heavier than the rear portion of the same, whereby, if the auxiliary frame is permitted to tilt freely upon its pivot, the traction wheels 27 will run upon the ground. Power for all of the operations of the machine is taken from the traction wheels 27. One especial object of the pivotal mounting of the auxiliary frame is that it is thus permitted to ride freely up and down when obstructions or unevenness are encountered.

When the machine is to be transported outside of the beet field, the forward end of the auxiliary frame is raised by attaching the crank handle 23 to one end of the shaft 16 and rotating the same, whereby the gear sectors 18 are simultaneously tilted, carrying with them the frame bars 19 to which they are bolted.

The construction covered by this invention, comprises an adjustable frame upon which a mechanism for uprooting the beets and topping devices are mounted, together with a carrier which takes the beets from the uprooting mechanism, and delivers them to the topping devices thereby completing the entire beet harvesting operation.

We claim:

1. In a harvesting machine, a frame mounted upon a pivot extending transversely of the machine, a wheel at one end of the frame arranged to contact with the earth, said frame being slightly over-balanced upon the wheel side of the pivot, and an endless conveyer adapted to be operated by the movement of said wheel over the earth said frame being adjustable bodily transversely of the machine.

2. In a harvesting machine, a main frame, a shaft pivotally mounted transversely of said frame, said shaft being threaded between its bearings in the frame, internally threaded gear sectors engaging the threads of said shaft, an auxiliary frame secured upon said sectors, a comparatively long pinion mounted upon the main frame in mesh with one of said sectors and means for rotating said pinion.

In testimony whereof we affix our signatures in presence of two witnesses.

GEORGE B. HAYES.
WALTER A. HAYES.

Witnesses:
A. J. O'BRIEN,
MAY CLEMENTS.

Copies of this patent may be obtained for five cents each, by addressing the "Commissioner of Patents, Washington, D. C."